United States Patent
Bae

(10) Patent No.: US 11,128,430 B2
(45) Date of Patent: Sep. 21, 2021

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventor: Jungnam Bae, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 299 days.

(21) Appl. No.: 16/380,497

(22) Filed: Apr. 10, 2019

(65) Prior Publication Data

US 2020/0136768 A1    Apr. 30, 2020

(30) Foreign Application Priority Data

Oct. 25, 2018 (KR) .................. 10-2018-0128123

(51) Int. Cl.
| | |
|---|---|
| H04W 76/15 | (2018.01) |
| H04L 5/00 | (2006.01) |
| H04L 5/26 | (2006.01) |
| H04W 76/14 | (2018.01) |
| H04W 72/08 | (2009.01) |

(52) U.S. Cl.
CPC ............ *H04L 5/006* (2013.01); *H04L 5/0005* (2013.01); *H04L 5/0085* (2013.01); *H04L 5/0091* (2013.01); *H04L 5/26* (2013.01); *H04W 72/087* (2013.01); *H04W 76/14* (2018.02); *H04W 76/15* (2018.02)

(58) Field of Classification Search
CPC ..... H04L 5/0005; H04L 5/006; H04L 5/0085; H04L 5/0091; H04L 5/26; H04W 72/087; H04W 76/14; H04W 76/15
See application file for complete search history.

(56) References Cited

U.S. PATENT DOCUMENTS

| | | | |
|---|---|---|---|
| 2015/0110229 A1* | 4/2015 | Kim ................... | H04B 1/006 375/347 |
| 2017/0062938 A1 | 3/2017 | Cheng | |

FOREIGN PATENT DOCUMENTS

| | | |
|---|---|---|
| KR | 10-2005-0048966 A | 5/2005 |
| KR | 10-2016-0004155 A | 1/2016 |
| KR | 10-2018-0053202 A | 5/2018 |

* cited by examiner

*Primary Examiner* — Brian P Cox
(74) *Attorney, Agent, or Firm* — Morgan, Lewis & Bockius LLP

(57) ABSTRACT

A vehicle capable of providing diversity of DSRC communication using a DSRC antenna for the DSRC communication and a WiFi antenna for WiFi communication is disclosed. The vehicle includes a first antenna configured to receive a first signal; a second antenna configured to receive a second signal; and a controller configured to synthesize the first signal and the second signal and process a signal in which the first signal and the second signal are synthesized according to a first communication method, in a first mode, and to alternately perform processing of a synthesized signal, in which the first signal and the second signal are synthesized, according to the first communication method and processing of the second signal according to a second communication method, in a second mode.

16 Claims, 10 Drawing Sheets

FIG. 6

| WiFi SERVICE | WiFi ANTENNA | | DIVERSITY | TIME DIVISION |
|---|---|---|---|---|
| | 5.8 GHz | 2.4 GHz | | |
| ○ | ○ | ○ | ○ | WiFi / V2X |
| × | ○ | × | ○ | V2X |

FIG. 7

| WiFi Data Rate (Mbps) | 80 ↑ | 60~80 | 40~60 | 40 ↓ | 0 |
|---|---|---|---|---|---|
| V2X TDD Rate | 1 | 2 | 3 | 4 | Full V2X | ns
VEHICLE AND METHOD FOR CONTROLLING THE SAME

CROSS-REFERENCE TO RELATED APPLICATION(S)

This application is based on and claims priority to Korean Patent Application No. 10-2018-0128123, filed on Oct. 25, 2018 in the Korean Intellectual Property Office, the disclosure of which is incorporated by reference in its entirety.

TECHNICAL FIELD

The present disclosure relates to a vehicle and a method for controlling the same, and more particularly, to a vehicle included a plurality of antennas for communicating, and a method for controlling the same.

BACKGROUND

A vehicle is a moving means or transportation means for driving on a road and railway using fossil fuels and/or electricity as a power source.

Such a vehicle generally includes an audio device and a video device to allow a driver to listen to music and to watch a video. Furthermore, a navigation system has been commonly provided in the vehicle to display a route to a destination to the driver.

There has been a growing demand for the vehicle to communicate with an external device, e.g., vehicle to everything (V2X) communication. For example, the vehicle may obtain traffic information on a road through communication with traffic infrastructure such as vehicle to infrastructure (V2I) communication, and may obtain traveling information of another vehicle through communication with the other vehicle such as vehicle to vehicle (V2V) communication.

The V2X communication with the external device is an important technology for realizing an autonomous vehicle in which the vehicle can communicate with another vehicle and objects through a wired or wireless network. The V2V communication with the external device may be realized by various communication methods. For example, the V2V communication with the external device may be realized by a dedicated short range communication (DSRC) communication standard such as a wireless access for vehicle environment (WAVE) communication standard.

The DSRC communication standard may use a frequency band of approximately 5.9 GHz. In addition, a widely known WiFi (Wireless Fidelity, IEEE 802.11a standard) communication method may also use the same frequency band as a low band of the DSRC communication standard.

SUMMARY

An object of the present disclosure is to provide a vehicle capable of improving V2V communication performance with an external device, and a method for controlling the same.

Another object of the present disclosure is to provide a vehicle capable of providing diversity of DSRC communication using a DSRC antenna for the DSRC communication and a WiFi antenna for WiFi communication, and a method for controlling the same.

Additional aspects of the disclosure will be set forth in part in the description which follows, and, in part, will be obvious from the description, or may be learned by practice of the disclosure.

In accordance with an aspect of the present disclosure, a vehicle includes: a first antenna configured to receive a first signal; a second antenna configured to receive a second signal; and a controller configured to synthesize the first signal and the second signal in a first mode and process a signal in which the first signal and the second signal are synthesized according to a first communication method, and to alternately process the signal in which the first signal and the second signal are synthesized in a second mode according to the first communication method and process the second signal according to a second communication method.

The controller may include a signal processor configured to process the signal according to the first communication method or the second communication method; a synthesizer configured to synthesize the first signal and the second signal; and a time divider configured to output the second signal to either the synthesizer or the signal processor.

The time divider may output the second signal to the synthesizer when communication by the second communication method is deactivated. The signal processor may process the signal synthesized by the synthesizer according to the first communication method.

The time divider may output the second signal to the synthesizer for a first time when communication by the second communication method is activated. The signal processor may process the signal output from the synthesizer according to the first communication method.

The time divider may output the second signal to the signal processor for a second time when communication by the second communication method is activated. The signal processor may process the second signal output from the time divider according to the second communication method.

The synthesizer may output the first signal to the signal processor for the second time when communication by the second communication method is activated. The signal processor may process the first signal according to the first communication method.

The controller may change the ratio of the first time to the second time according to a communication rate by the second communication method.

The controller may decrease the ratio of the first time to the second time as the communication rate by the second communication method increases.

The controller may increase the ratio of the first time to the second time as the communication rate by the second communication method decreases.

In accordance with another aspect of the present disclosure, a method for controlling a vehicle, which comprises a first antenna configured to receive a first signal and a second antenna configured to receive a second signal, includes: synthesizing the first signal and the second signal in a first mode and processing a signal in which the first signal and the second signal are synthesized according to a first communication method; and alternately processing the signal in which the first signal and the second signal are synthesized in a second mode according to the first communication method and processing the second signal according to a second communication method.

The processing of the signal in which the first signal and the second signal are synthesized according to the first communication method may include outputting the second signal to the synthesizer by a time divider when communication by the second communication method is deactivated; and processing the signal synthesized by the synthesizer by a signal processor according to the first communication method.

The alternately performing of the processing of the synthesized signal according to the first communication method and the processing of the second signal according to the second communication method may include outputting the second signal to the synthesizer by a time divider for a first time when communication by the second communication method is activated; and processing the signal synthesized by the synthesizer by a signal processor according to the first communication method.

The method may further include outputting the second signal to the signal processor by the time divider for a second time when communication by the second communication method is activated; and processing the second signal by the signal processor according to the second communication method.

The method may further include outputting the first signal to the signal processor by the synthesizer for the second time when communication by the second communication method is activated; and processing the first signal by the signal processor according to the first communication method.

The ratio of the first time to the second time may change according to a communication rate by the second communication method.

The ratio of the first time to the second time may decrease as the communication rate by the second communication method increases.

The ratio of the first time to the second time may increase as the communication rate by the second communication method decreases.

In accordance with another aspect of the present disclosure, a communication apparatus for a vehicle includes: a first antenna configured to receive a first signal; a second antenna configured to receive a second signal; a signal processor configured to process a signal according to a first communication method or a second communication method; a synthesizer configured to synthesize the first signal and the second signal; and a time divider configured to output the second signal to either the synthesizer or the signal processor.

The time divider may output the second signal to the synthesizer when communication by the second communication method is deactivated. The signal processor may process the signal synthesized by the synthesizer according to the first communication method.

The time divider may output the second signal to the synthesizer for a first time when communication by the second communication method is activated. The signal processor may process the signal output from the synthesizer according to the first communication method. The time divider may output the second signal to the signal processor for a second time. The signal processor may process the second signal output from the time divider according to the second communication method.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a view illustrating the V2X communication of the vehicle and the WiFi communication according to an embodiment;

FIGS. 7 and 8A-8E are views illustrating time division between the V2X communication of the vehicle and the WiFi communication according to an embodiment.

DETAILED DESCRIPTION

Figure 1:
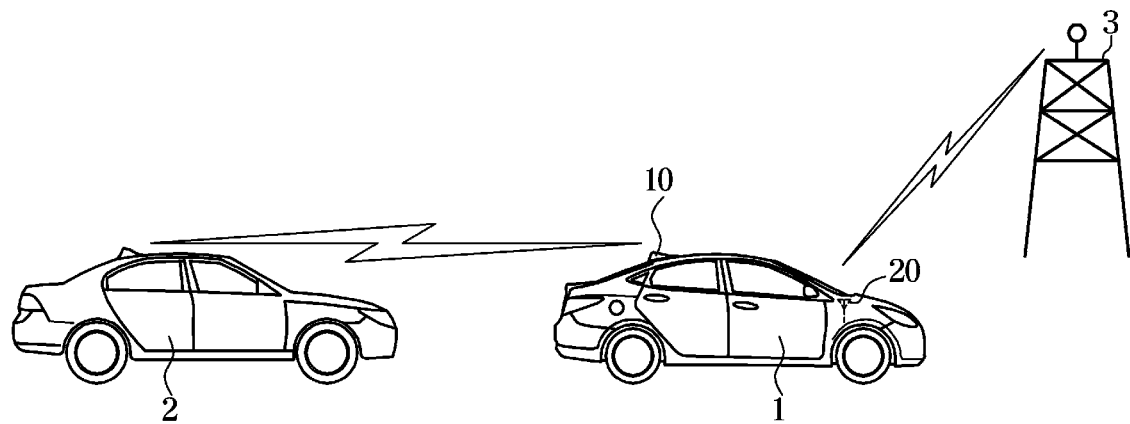
FIG. 1 is a view illustrating an example in which a vehicle communicates with another vehicle and communication infrastructure according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, an operation principle and embodiments of the present disclosure will be described with reference to the accompanying drawings.

Figure 2:
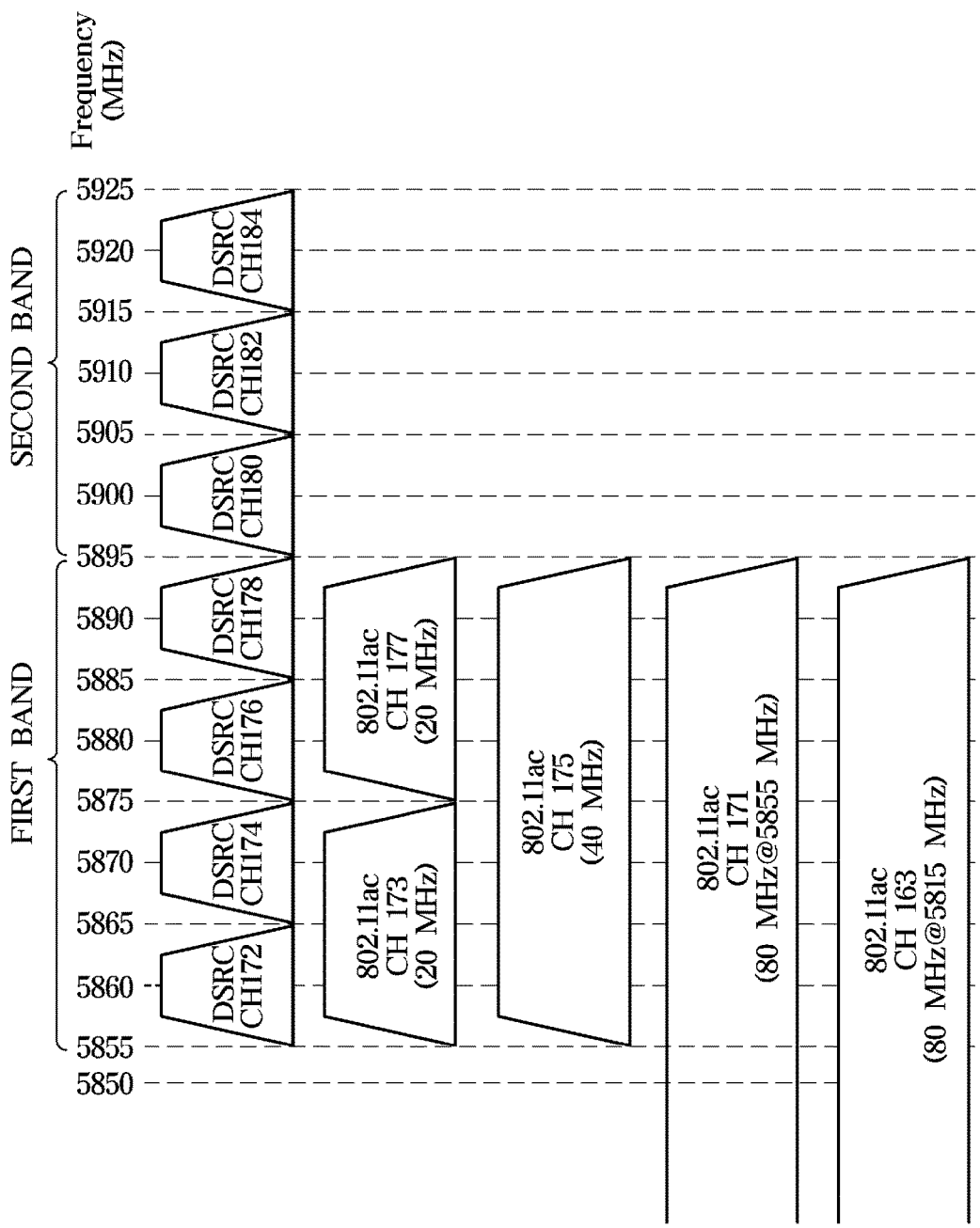
FIG. 2 is a view illustrating a frequency band for WiFi communication and a frequency band for V2X communication.
Figure 3:
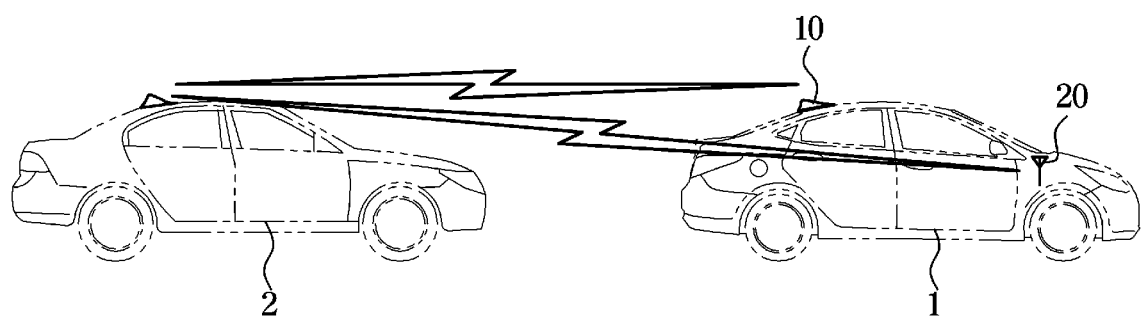
FIG. 3 is a view illustrating another example in which the vehicle communicates the other vehicle according to an embodiment.

FIG. 1 is a view illustrating an example in which a vehicle communicates with another vehicle and communication infrastructure according to an embodiment, FIG. 2 is a view illustrating a frequency band for WiFi communication and a frequency band for V2X communication, and FIG. 3 is a view illustrating another example in which the vehicle communicates the other vehicle according to an embodiment.

As illustrated in FIG. 1, a vehicle 1 may communicate with another vehicle 2 and communication infrastructure 3.

The vehicle 1 may communicate with external devices for various purposes. For example, the vehicle 1 may communicate with the communication infrastructure 3 in order to update software of electronic devices provided in the vehicle 1.

The communication infrastructure 3 may provide a communication service to the vehicle 1. The communication infrastructure 3 may be a communication repeater that relays communication between the vehicle 1 and an external device so that the vehicle 1 can communicate with the external device. For example, the communication infrastructure 3 may be a base station, an access point (AP), or the like.

The vehicle 1 may communicate with the communication infrastructure 3 in various communication methods. For example, the vehicle 1 may communicate with the communication infrastructure 3 using Time Division Multiple Access (TDMA), Code Division Multiple Access (CDMA), Wide Code Division Multiple Access (WCDMA), Code Division Multiple Access 2000 (CDMA2000), Wireless Broadband (Wibro), World Interoperability for Microwave Access (WiMAX), Long Term Evolution (LTE), and Wireless Broadband Evolution (Wibro Evolution).

Particularly, the vehicle 1 may use WiFi (wireless fidelity: WiFi™) communication.

WiFi communication is a technology for a wireless local area network based on the IEEE 802.11a standard. A variety of computing/communication devices such as desktop computers, laptop computers, tablet computers, and smart phones use the WiFi communication.

As illustrated in FIG. 2, the WiFi communication may use a 2.4 GHz (wavelength: 12 cm) frequency band and a 5.8 GHz (wavelength: 5 cm) frequency band. The frequency band for the WiFi communication is divided into a plurality of channels, and each of the channels may be time-shared by a plurality of networks.

The WiFi communication is a communication technology for communication between stationary devices and may not be suitable for communication with moving devices. For example, when the vehicle 1 communicates with the communication infrastructure 3 through the WiFi communication, it may be desirable for the vehicle 1 to stop.

The vehicle 1 may be provided with a separate WiFi antenna 20 for communicating with the communication infrastructure 3 using the WiFi communication. For example, the WiFi antenna 20 may be installed near a front seat of the vehicle 1, such as a head unit or a console box, as illustrated in FIG. 1.

The vehicle 1 may communicate with traffic infrastructure.

The traffic infrastructure may provide traffic information to the vehicle 1. The traffic infrastructure may be a communication repeater that relays communication between the vehicle 1 and a traffic information server so that the vehicle 1 can communicate with the traffic information server.

The vehicle 1 may communicate with the another vehicle 2.

The vehicle 1 may transmit and receive data to and from a communication device of the other vehicle 2 with the other vehicle 2 as a target. For example, a driver may exchange information with the driver of the other vehicle 2 using the communication device of the vehicle 1.

Further, the vehicle 1 may communicate with other devices in a multihop method using the other vehicle 2. For example, when the vehicle 1 is out of a communication range, the vehicle 1 may exchange data with the communication infrastructure 3 through the other vehicle 2. In addition, the vehicle 1 may receive the traffic information from the traffic infrastructure through the other vehicle 2.

The vehicle 1 can communicate with the other vehicle 2 or the traffic infrastructure in various communication methods. For example, the vehicle 1 may use a Dedicated Short Range Communication (DSRC) or a Wireless Access in Vehicular Environments (WAVE).

The DSRC may support short-range communication between a small base station installed around roads and vehicles. In particular, the DSRC may support wireless communication between Road Side Equipment (RSE) and On-Board Equipment (OBE) using the 5.8 GHz frequency band as illustrated in FIG. 2.

The DSRC may have a communication distance of approximately 10 m to 100 m, and may have a bandwidth of approximately 5 MHz to 10 MHz. In addition, the DSRC may have a data transmission rate of approximately 500 kbps to 1 Mbps.

The WAVE is a vehicle communication standard based on the IEEE 802.11p standard, and is a vehicle communication technology developed from the DSRC. The WAVE may support communication between the vehicles as well as short-range communication between the small base station and the vehicles.

The WAVE may also support wireless communication between the OBEs as well as wireless communication between the RSE and the OBE using the 5.8 GHz frequency band.

The WAVE may have a communication distance of approximately 1 km and may have a bandwidth of approximately 10 MHz. In addition, the WAVE may have a data transmission rate of approximately 54 Mbps.

The vehicle 1 may be provided with a separate V2X antenna 10 for communicating with the other vehicle 2 or the traffic infrastructure using V2X communication such as the DSRC or the WAVE. For example, the V2X antenna 10 may be installed behind a roof of the vehicle 1, as illustrated in FIG. 1.

When the communication frequency band of the WiFi communication is compared with the communication frequency band of the V2X communication, the communication frequency of the WiFi communication may overlap with the communication frequency of the V2X communication at approximately 5.8 GHz as illustrated in FIG. 2.

The V2X communication may use a radio signal in the frequency band of approximately 5855 to 5895 MHz and a radio signal in the frequency band of approximately 5895 to 5925 MHz, and the WiFi communication may use a radio signal in the frequency band of approximately 2400 to 2483 MHz and a radio signal in the frequency band of approximately 5000 to 5895 MHz.

Among the frequencies used for the V2X communication, a frequency band of 5855 to 5864 MHz is a first channel (CH172), a frequency band of 5865 to 5874 MHz is a second channel (CH174), a frequency band of 5875 to 5884 MHz is a third channel (CH176), a frequency band of 5885 to 5894 MHz is a fourth channel (CH178), a frequency band of 5895 to 5904 MHz is a fifth channel (CH180), a frequency band of 5905 to 5914 MHz is a sixth channel (CH182), and a frequency band of 5915 to 5925 MHz is a seventh channel (CH184).

The V2X communication and the WiFi communication are part of the same frequency band used for communication. The V2X communication and the WiFi communication are commonly used to perform communication using the 5855 to 5895 MHz frequency band.

Therefore, the WiFi antenna 20 and the V2X antenna 10 are compatible with each other. In other words, the WiFi antenna 20 may be used for the V2X communication as well as the WiFi communication.

In addition, the WiFi communication may be provided in a special environment, such as when the vehicle 1 stops or the driver particularly requests a WiFi communication service.

On the other hand, the V2X communication may be provided at all times, for example, while the vehicle 1 is driving. Particularly, in the V2X communication used in an autonomous vehicle, reliability of a certain level or higher is required for the safety of the driver.

For communication reliability, diversity of the V2X communication may be provided.

For example, a plurality of antennas spaced apart from each other may be provided for the V2X communication. When the same radio waves are received at two points sufficiently apart from each other, the radio waves are reflected by a reflector such as a building and arrive at a difference in a propagation route, and interference may occur due to the difference of the propagation route, thereby causing fading. At this time, if receiving positions are different, fading states of the received radio waves are different. Therefore, signals received at different positions may be appropriately synthesized or selected to reduce the effect of signals fading.

The vehicle 1 may use the WiFi antenna 20 to provide the diversity of the V2X communication.

For example, the vehicle 1 may communicate with the other vehicle 2 using the V2X antenna 10 and the WiFi antenna 20 as illustrated in FIG. 3. The V2X antenna 10 and the WiFi antenna 20 may exchange data with the other vehicle 2 independently of each other. The vehicle 1 may receive the data transmitted by the other vehicle 2 by compositing or selecting the data received through the V2X antenna 10 and the WiFi antenna 20, respectively.

Hereinafter, the configuration and operation of the vehicle 1 will be described to provide the diversity of the V2X communication.

Figure 4:
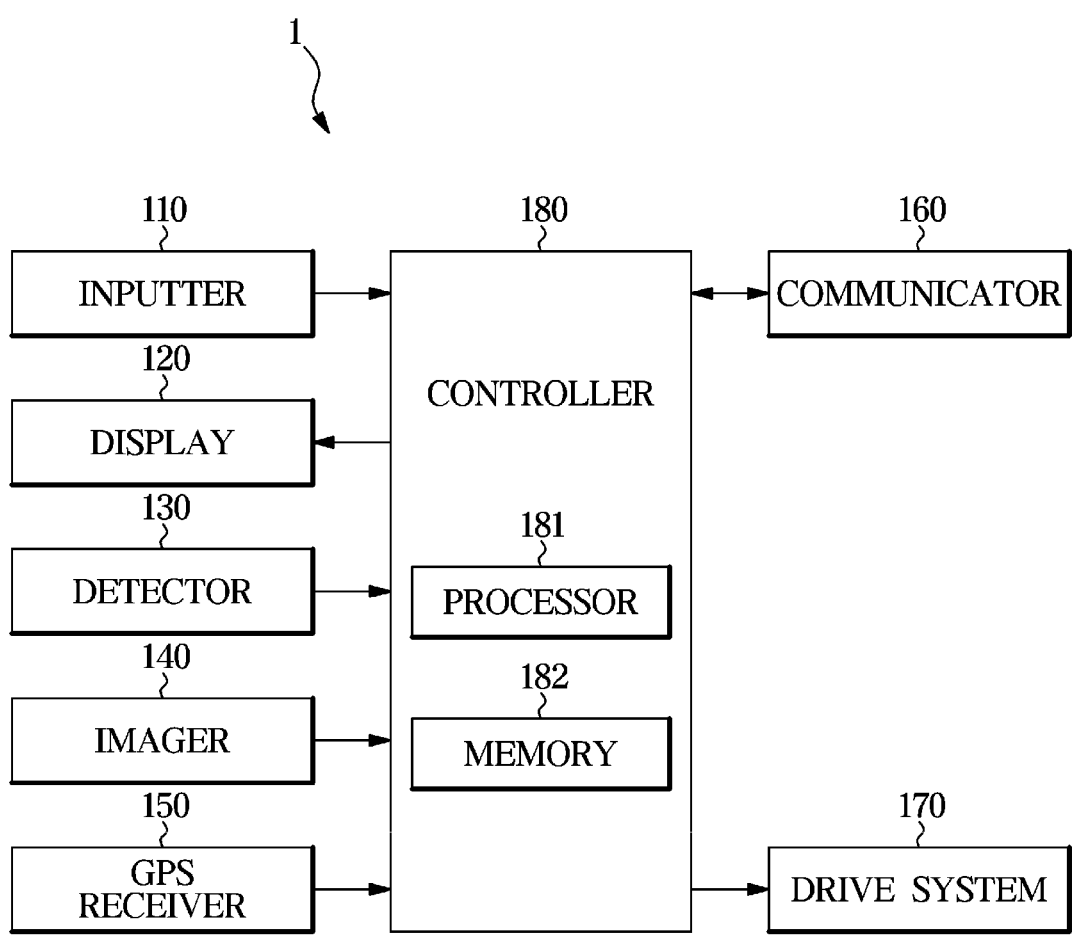
FIG. 4 is a view illustrating a configuration of the vehicle according to an embodiment.

FIG. 4 is a view illustrating a configuration of the vehicle according to an embodiment.

As illustrated in FIG. 4, the vehicle 1 may include an input device 110, a display 120, a detector 130, an imager 140, a global position system (GPS) receiver 150, a communicator 160, a drive system 170, and a controller 180. Here, the controller 180 may be an electronic control unit (ECU).

The input device 110 may receive inputs related to the driving and communication of the vehicle 1 from the driver. The input device 110 may receive a software upgrade request of the vehicle 1 through the WiFi communication from the driver, for example, or receive a traffic information request through the V2X communication.

The input device 110 may include a plurality of switches for receiving inputs of the driver. The input device 110 may also include a push switch and a membrane switch operated by a user pressing, or a touch switch operated by contact of the user's body part.

The display 120 may display information about the driving and communication of the vehicle 1 to the driver. The display 120 may display the progress of a software upgrade through the WiFi communication or the traffic information of a surrounding road received through the V2X communication, for example.

The display 120 may include various types of display panels for displaying information about the driving and communication of the vehicle 1. For example, the display 120 may include a light emitting diode (LED) panel or an organic light emitting diode (OLED) panel or a liquid crystal display (LCD) panel.

The display 120 may also apply a touch screen panel (TSP) that receives inputs from the driver and displays operation information corresponding to the received control command.

The touch screen panel may include a display for displaying the operation information and/or a control command, a touch panel for detecting coordinates of a part of the user's body making contact, and a touch screen controller for determining the control command inputted by the user based on the touch coordinates detected by the touch panel. The touch screen controller may compare the touch coordinates of the user detected through the touch panel with the coordinates of the control command displayed through the display to recognize the control command inputted by the user.

The detector 130 may detect state information of the vehicle 1.

The detector 130 may further include at least one of an angular velocity detector detecting an angular velocity of a steering wheel to detect a steering angle of the vehicle 1, a speed detector detecting a driving speed of the vehicle 1, a yaw rate detector detecting a yaw moment of the vehicle 1, and an acceleration detector detecting an acceleration of the vehicle 1.

The speed detector may be a wheel speed sensor provided on front, rear, right, and left vehicle wheels, or an acceleration sensor detecting acceleration of the vehicle 1.

The detector 130 may include a distance detector identifying a distance between the vehicle 1 and an object placed outside the vehicle 1. The object may include other vehicles driving in front of the vehicle 1, stationary objects, such as structures installed in the vicinity of the road, and other vehicles approaching in an opposite lane.

The distance detector may output a signal corresponding to detecting an object on the front, left and right sides of the vehicle at the current position of the vehicle 1, and transmit the signal corresponding to a distance to the detected object to the controller 180.

The distance detector may include a light detection and ranging (LiDAR) sensor. The LiDAR sensor is a noncontact distance sensor based on a knowledge laser radar.

The distance detector may include an ultrasonic sensor or a radar sensor.

The imager 140 may obtain an image of the road, and transmit the obtained image to the controller 180. The image of the road may be an image of the road in the forward direction with respect to the driving direction of the vehicle 1.

Particularly, the imager 140 is a device configured to obtain information of the object and convert the information into an electrical image signal. For example, the imager 140 may obtain information related to an external environment of the vehicle, e.g. a road on which the vehicle drives and an object in the front side and the lateral side, in the current location and transmit an image signal of information of the detected object to the controller 180.

The imager 140 may include a charge-coupled device (CCD) or Complementary metal-oxide-semiconductor (CMOS) image sensor, as a camera.

The imager 140 may be provided in a front window glass, particularly a window glass inside of the vehicle 1, in a room mirror inside of the vehicle 1, or in a roof panel to be exposed to the outside.

The imager 140 may be a rear camera, a black box camera (i.e., dash cam) and a camera of an autonomous driving controller provided for autonomous driving.

The GPS receiver 150 may receive position information from a plurality of satellites to obtain current position information of the vehicle 1. The GPS receiver 150 may include an antenna receiving the signal of the plurality of GPS satellites, software obtaining the position of the vehicle 1 by using distance and time information corresponding to the position signal of the plurality of GPS satellites, and an output device outputting the obtained current position information of the vehicle 1.

The communicator 160 may perform communication with at least one of the other vehicle, the traffic infrastructure, or the communication infrastructure 3. The communicator 160 may transmit a communication signal, which is received from at least one of the other vehicle, the traffic infrastructure, or the communication infrastructure 3 to the controller 180. The communicator 160 may transmit the communication signal corresponding to the state information of the vehicle 1, detection information and the users input information, to at least one of the other vehicle, the traffic infrastructure, or the communication infrastructure 3 based on the control command of the controller 180.

A configuration and operation of the communicator 160 will be described in detail below.

The drive system 170 may be a device for driving the vehicle 1, and may include a braking system, a suspension system, a power generating system, a power transmission system and a steering system.

The controller 180 may include a memory 182 that stores programs and data for controlling the driving and/or communication of the vehicle 1 and a processor 181 that generates the signal for controlling the driving and/or communication of the vehicle 1.

The memory 182 may include a non-volatile memory such as a flash memory, a Read Only Memory (ROM), an Erasable Programmable Read Only Memory (EPROM) as well as a volatile memory such as a Static Random Access Memory (S-RAM) and a Dynamic Random Access Memory (D-RAM).

The processor 181 may include a main processor for controlling the driving of the vehicle 1, a communication processor for controlling communication of the vehicle 1, an image processor for processing images of the imager 140, and the like.

The controller 180 may be provided in the vehicle 1 and control a variety of the drive systems 170 and an additional device provided in the vehicle 1. The controller 180 may be provided in the autonomous driving controller provided for the autonomous driving.

The controller 180 may control the autonomous driving based on user input information of the input device 110, image information of the imager 140, detection information of the detector 130, position information of the GPS receiver 150, and information received through the communicator 160.

When a selection signal of the navigation mode that is selected through the input device 110, is received, the controller 180 may identify a current position received through the GPS receiver 150, confirm a destination selected through the input device 110, confirm map information stored in the controller 180, search for a route from the current position to the destination, match the searched route with the map, and allow the map with which the route is matched to be displayed on the display 120.

When the selection signal of the autonomous driving mode is received, the controller 180 may perform the autonomous driving mode in conjunction with the navigation mode and allow the vehicle 1 to autonomously drive from the current position to the destination by controlling the drive system 170 based on navigation information, image information, distance information, speed information and external information.

The external information may be information received through the communication apparatus, particularly information transmitted from at least one of the other vehicle, the traffic infrastructure, or the communication infrastructure.

In the autonomous driving mode, the controller 180 may identify a position of the other vehicle driving in the lane on the left side and the right side of the vehicle 1, based on information on a distance to an obstacle detected by the distance detector, and identify a distance of the other vehicle corresponding to the identified other vehicle, thereby regulating a speed of the vehicle based on the distance to the identified other vehicle.

In the autonomous driving mode, when an image of the road is received, the controller 180 may recognize a lane of the road by performing the image processing by receiving the image of the road, and recognize a lane in which the vehicle drives, based on the position information of the recognized lane.

In the autonomous driving mode, the controller 180 may control a driving direction (steering) of the vehicle to maintain or change the lane, based on the distance to other vehicle, the current position, the recognized lane, and the searched route.

In the autonomous driving mode, the controller 180 may control the display 132 to display an image about the front, rear, left and right side of the vehicle obtained by the imager 140, and to display map information with which the route is matched and route guidance information in conjunction with the navigation mode.

The navigation information may include destination information and map information, and further include the name of the road on the map, the position information of the road, the type of the road, and the route number of the road.

The controller 180 may perform the manual driving mode when the autonomous driving mode is released. That is, the controller 180 may allow the speed of the vehicle 1 to be regulated by controlling the power system and the brake system based on operation information of a brake pedal and an acceleration pedal that is operated by the driver during the manual driving mode, and allow the driving direction of the vehicle 1 to be regulated by controlling the steering system based on steering information of the steering wheel that is operated by the driver.

During driving, the controller 180 may control the display 120 to display forward traffic information transmitted from the other vehicle, access information of the other vehicle, and collision estimation information.

In addition, during driving, the controller 180 may control a speaker (not shown) to output the forward traffic information transmitted from the other vehicle, the access information of the other vehicle, and the collision estimation information, as sound.

The controller 180 may transmit the state information of the vehicle 1 and the surrounding information of the vehicle 1 to the other vehicle 2 or the traffic infrastructure through the communicator 160, and receive state information of the other vehicle 2 and surrounding information of the other vehicle 2 through the communicator 160. Therefore, the controller 180 may control at least one operation of the drive system and the additional device of the vehicle, based on the received information.

In particular, the controller 180 may implement space diversity using the V2X antenna 10 and the WiFi antenna 20 included in the communicator 160. The controller 180 may receive the state information of the other vehicle 2 and surrounding information of the other vehicle 2 through the V2X antenna 10 and the WiFi antenna 20.

In addition, the controller 180 may utilize the WiFi antenna 20 in communication with the communication infrastructure 3 in response to the driver's request for WiFi connection or a software upgrade. For example, the controller 180 may receive data for the software upgrade from the communication infrastructure 3 through the WiFi antenna 20.

Particularly, the controller 180 may control the communicator 160 such that the V2X communication and the WiFi communication share the WiFi antenna 20 at the same time. For example, the controller 180 may divide the time into vehicular communication use time and WiFi use time, and may use the WiFi antenna 20 for the V2X communication during the vehicular communication use time and use the WiFi antenna 20 during the WiFi use time. In other words, the controller 180 may use time division to control the communicator 160 such that the V2X communication and the WiFi communication share the WiFi antenna 20.

According to the performance of the components of the vehicle, as illustrated in FIG. 4, at least one component may be added or omitted. In addition, it will be readily understood by those skilled in the art that the mutual position of the components may be changed corresponding to the performance or structure of the system.

Meanwhile, the components illustrated in FIG. 4 represent software and/or hardware components such as a Field Programmable Gate Array (FPGA) and an Application Specific Integrated Circuit (ASIC).

Figure 5:
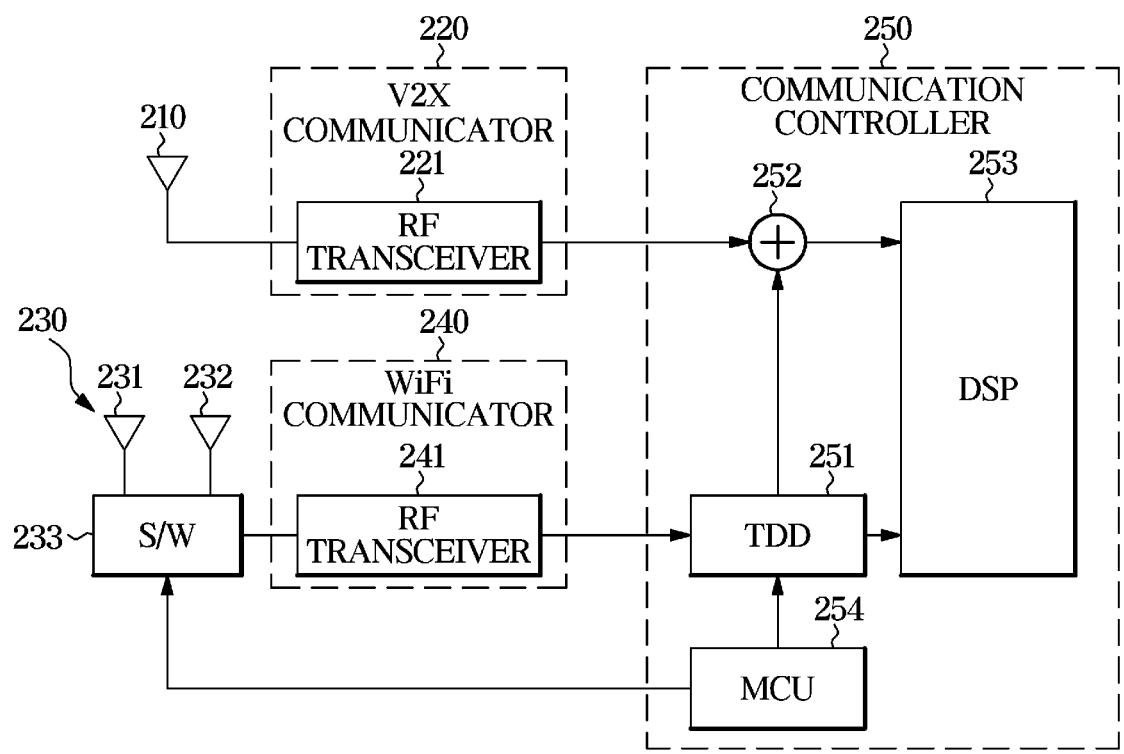
FIG. 5 is a view illustrating a configuration of a controller and a communicator included in the vehicle according to an embodiment.

FIG. 5 is a view illustrating a configuration of a controller and a communicator included in the vehicle according to an embodiment, FIG. 6 is a view illustrating the V2X communication of the vehicle and the WiFi communication according to an embodiment, and FIGS. 7 and 8A-8E are views illustrating time division between the V2X communication of the vehicle and the WiFi communication according to an embodiment.

As illustrated in FIG. 5, the vehicle 1 may include a V2X communication antenna 210, a V2X communicator 220, a WiFi communication antenna 230, a WiFi communicator 240, and a communication controller 250.

The V2X communication antenna 210 may be used for the V2X communication. The V2X communication antenna 210 may transmit and receive a radio signal in a frequency band of approximately 5855 to 5925 MHz. For example, the V2X communication antenna 210 may radiate the radio wave in the frequency band of approximately 5855 to 5925 MHz to free space and receive the radio wave in the frequency band of approximately 5855 to 5925 MHz from the free space.

The V2X communication antenna 210 may be connected to the V2X communicator 220. The V2X communication antenna 210 may receive a transmission signal in the frequency band of approximately 5855 to 5925 MHz from the V2X communicator 220 and transmit a reception signal in the frequency band of approximately 5855 to 5925 MHz to the V2X communicator 220.

The V2X communicator 220 may include a V2X RF transceiver 221 capable of transmitting and receiving the signal in the frequency band of approximately 5855 to 5925 MHz.

The V2X RF transceiver 221 may be connected to the V2X communication antenna 210 and may be connected to the communication controller 250.

The V2X RF transceiver 221 may separate the transmission signal transmitted from the communication controller 250 to the V2X communication antenna 210 and the reception signal transmitted from the V2X communication antenna 210 to the communication controller 250. The V2X RF transceiver 221 may filter the reception signal received by the V2X communication antenna 210 and amplify the reception signal received by the V2X communication antenna 210.

The V2X RF transceiver 221 may perform frequency conversion of a high frequency reception signal in the frequency band of approximately 5855 to 5925 MHz received by the V2X communication antenna 210 into a low frequency reception signal of an intermediate frequency band. The V2X RF transceiver 221 may filter the frequency conversion of a low frequency transmission signal of a daytime frequency received from the communication controller 250 into the high frequency reception signal in the frequency band of approximately 5855 to 5925 MHz.

The WiFi communication antenna 230 may be used for the WiFi communication.

The WiFi communication antenna 230 may include a first WiFi communication antenna 231 capable of transmitting and receiving the radio signal in the frequency band of approximately 5000 to 5895 MHz and a second WiFi communication antenna 232 capable of transmitting and receiving the radio signal in the frequency band of approximately 2400 to 2483 MHz, and a switch module 233 for activating one of the first WiFi communication antenna 231 and the second WiFi communication antenna 232.

The first WiFi communication antenna 231 may transmit and receive the radio signal in the frequency band of approximately 5000 to 5895 MHz. For example, the first WiFi communication antenna 231 may radiate the radio wave in the frequency band of approximately 5000 to 5895 MHz to free space, and may receive the radio wave in the frequency band of approximately 5000 to 5895 MHz from the free space.

As described above, the first WiFi communication antenna 231 is capable of transmitting and receiving the radio signal for the WiFi communication and transmitting and receiving the radio signal for the V2X communication. Depending on whether or not the WiFi communication service is activated, the first WiFi communication antenna 231 may transmit/receive the radio signal for the WiFi communication or transmit/receive the radio signal for the V2X communication.

The first WiFi communication antenna 231 may be connected to the WiFi communicator 240. The first WiFi communication antenna 231 may receive the transmission signal in the frequency band of approximately 5000 to 5895 MHz from the WiFi communicator 240 and transmit the reception signal in the frequency band of approximately 5000 to 5895 MHz to the WiFi communicator 240.

The second WiFi communication antenna 232 may transmit and receive the radio signal in the frequency band of approximately 2400 to 2483 MHz. For example, the second WiFi communication antenna 232 may radiate the radio wave in the frequency band of approximately 2400 to 2483 MHz to free space, and may receive the radio wave in the frequency band of approximately 2400 to 2483 MHz from the free space.

The second WiFi communication antenna 232 may be connected to the WiFi communicator 240. The second WiFi communication antenna 232 may receive the transmission signal in the frequency band of approximately 2400 to 2483 MHz from the WiFi communicator 240 and transmit the reception signal in the frequency band of approximately 2400 to 2483 MHz to the WiFi communicator 240.

The second WiFi communication antenna 232 may be activated or deactivated depending on a switching operation of the switch module 233.

The switch module 233 may activate the first WiFi communication antenna 231 or the second WiFi communication antenna 232 depending on whether the WiFi communication service is activated or not. For example, as illustrated in FIG. 6, when the WiFi communication service is activated, the switch module 233 may activate both the first WiFi communication antenna 231 and the second WiFi communication antenna 232. When the WiFi communication service is deactivated, the switch module 233 may activate the first WiFi communication antenna 231 and deactivate the second WiFi communication antenna 232.

The WiFi communicator 240 may include a WiFi RF transceiver 241 capable of transmitting the signal in the frequency band of approximately 5000 to 5895 MHz and the signal in the frequency band of approximately 2400 to 2483 MHz.

The WiFi RF transceiver 241 may be connected to the WiFi communication antenna 230 and may be connected to the communication controller 250.

The WiFi RF transceiver 241 may separate the transmission signal transmitted from the communication controller 250 to the WiFi communication antenna 230 and the reception signal transmitted from the WiFi communication antenna 230 to the communication controller 250. The WiFi RF transceiver 241 may filter the reception signal received by the WiFi communication antenna 230 and amplify the reception signal received by the WiFi communication antenna 230.

The WiFi RF transceiver 241 may perform the frequency conversion of the high frequency reception signal in the frequency band of approximately 5000 to 5895 MHz or in the frequency band of approximately 2400 to 2483 MHz received by the WiFi communication antenna 230 into the low frequency reception signal of an intermediate frequency band. The WiFi RF transceiver 241 may perform the frequency conversion of a low frequency transmission signal of the daytime frequency received from the communication controller 250 into the high frequency reception signal in the frequency band of approximately 5000 to 5895 MHz or in the frequency band of approximately 2400 to 2483 MHz.

The communication controller 250 may include a time divider 251 for temporally dividing the WiFi communication and the V2X communication, a synthesizer 252 for synthesizing the signal received through the V2X communication antenna 210 and the signal received through the WiFi communication antenna 230, a digital signal processor 253 for processing the radio signal by the V2X communication and processing the radio signal by the WiFi communication, and a microcontroller 254 for controlling the switch module 233 of the WiFi communication antenna 230 and the time divider 251.

The time divider 251 may be connected to the microcontroller 254, the WiFi communicator 240, the synthesizer 252 and the digital signal processor 253 and may temporally divide the use of the WiFi communication antenna 230 for the WiFi communication and the use of the WiFi communication antenna 230 for the V2X communication in accordance with a control signal of the microcontroller 254.

When the WiFi communication service is deactivated, the time divider 251 may only use the WiFi communication antenna 230 for the V2X communication, as illustrated in FIG. 6.

Particularly, the time divider 251 may connect the WiFi communication antenna 230 to the synthesizer 252 while the WiFi communication service is deactivated. Thereby, the signal received by the WiFi communication antenna 230 may be synthesized with the signal received by the V2X communication antenna 210 by the synthesizer 252.

As a result, while the WiFi communication service is deactivated, the space diversity for the V2X communication may be provided using the V2X communication antenna 210 and the WiFi communication antenna 230 as illustrated in FIG. 6.

When the WiFi communication service is activated, the time divider 251 may temporally divide the use of the WiFi communication antenna 230 for the WiFi communication and the WiFi communication antenna 230 for the V2X communication as illustrated in FIG. 6.

The time divider 251 may connect the WiFi communication antenna 230 to the synthesizer 252 for a first time and the time divider 251 may transmit the WiFi communication antenna 230 to the digital signal processor 253 for a second time after the first time. The signal received by the WiFi communication antenna 230 during the first time is synthesized with the signal received by the V2X communication antenna 210 by the synthesizer 252 and the signal received by the WiFi communication antenna 230 during the second time may be processed by the digital signal processor 253 in accordance with a WiFi communication standard.

As a result, the space diversity for the V2X communication may be provided using the V2X communication antenna 210 and the WiFi communication antenna 230 for the first time as illustrated in FIG. 6, and the space diversity for the V2X communication may not be provided for the second time.

The synthesizer 252 may be connected to the V2X communicator 220, the time divider 251 and the digital signal processor 253. The synthesizer 252 may synthesize the signal received through the V2X communication antenna 210 and the signal received through the WiFi communication antenna 230.

When the WiFi communication service is deactivated, the synthesizer 252 may always synthesize the signal received through the V2X communication antenna 210 with the signal received through the WiFi communication antenna 230, and output the synthesized signal to the digital signal processor 253.

When the WiFi communication service is activated, the synthesizer 252 may synthesize the signal received through the V2X communication antenna 210 and the signal received through the WiFi communication antenna 230 according to the operation of the time divider 251 or output the signal received through the V2X communication antenna 210.

Particularly, during the first time when the WiFi communication antenna 230 is used for the V2X communication, the synthesizer 252 may synthesize the signal received through the V2X communication antenna 210 and the signal received through the WiFi communication antenna 230 and may output the synthesized signal to the digital signal processor 253. The synthesizer 252 may directly output the signal received through the V2X communication antenna 210 to the digital signal processor 253 as it is for the second time when the WiFi communication antenna 230 is used for the WiFi communication.

The digital signal processor 253 may be connected to the time divider 251 and the synthesizer 252 and may process the signals received by the antennas according to the V2X communication standard or the WiFi communication standard.

For example, the digital signal processor 253 may process the signal received from the synthesizer 252 in accordance with the V2X communication standard and may process the signal received from the time divider 251 according to the WiFi communication standard.

The microcontroller 254 may control the switch module 233 of the WiFi communication antenna 230 according to whether the WiFi communication service is activated or not.

When the WiFi communication service is activated, the microcontroller 254 may control the switch module 233 to activate both the first WiFi communication antenna 231 and the second WiFi communication antenna 232 as illustrated in FIG. 6. When the WiFi communication service is deactivated, the microcontroller 254 may control the switch module 233 to activate the first WiFi communication antenna 231 and deactivate the second WiFi communication antenna 232 as illustrated in FIG. 6.

In addition, the microcontroller 254 may control the time divider 251 according to whether the WiFi communication service is activated or not.

When the WiFi communication service is deactivated, the microcontroller 254 may control the time divider 251 to output the signal received by the WiFi communication antenna 230 to the synthesizer 252 as illustrated in FIG. 6.

When the WiFi communication service is activated, the microcontroller 254 may control the time divider 251 to output the signal received by the WiFi communication antenna 230 for the first time to the synthesizer 252, and may control the time divider 251 to output the signal received by the WiFi communication antenna 230 for the second time to the digital signal processor 253. In other words, when the WiFi communication service is activated, the WiFi communication antenna 230 is used for the V2X communication for the first time and the WiFi communication for the second time.

At this time, the first time and the second time may vary according to the WiFi communication rate. Particularly, the ratio of the first time to the second time may vary depending on the WiFi communication rate.

As the WiFi communication rate increases, the second time may increase and the ratio of the first time to the second time may decrease. As the WiFi communication rate decreases, the second time may decrease and the ratio of the first time to the second time may increase.

Figure 8A:
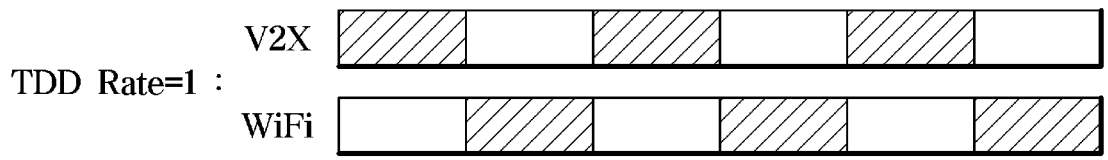

For example, when the WiFi communication rate is 80 Mbps or higher, the ratio of the first time to the second time may be "1," as illustrated in FIG. 7. As illustrated in FIG. 8A, the first time when the WiFi communication antenna 230 is used for the V2X communication and the second time when the WiFi communication antenna 230 is used for the WiFi communication may be the same.

Figure 8B:
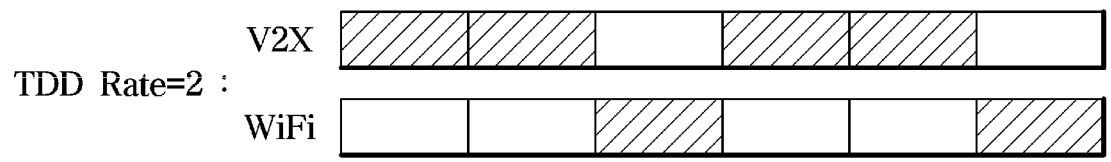

When the WiFi communication rate is greater than or equal to 60 Mbps and less than 80 Mbps, the ratio of the first time to the second time may be "2," as illustrated in FIG. 7. As illustrated in FIG. 8B, the first time may be twice as long as the second time.

Figure 8C:
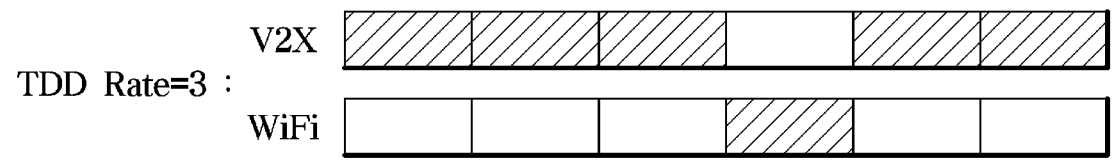

When the WiFi communication rate is greater than or equal to 40 Mbps and less than 60 Mbps, the ratio of the first time to the second time may be "3," as illustrated in FIG. 7. As illustrated in FIG. 8C, the first time may be three times the second time.

Figure 8D:
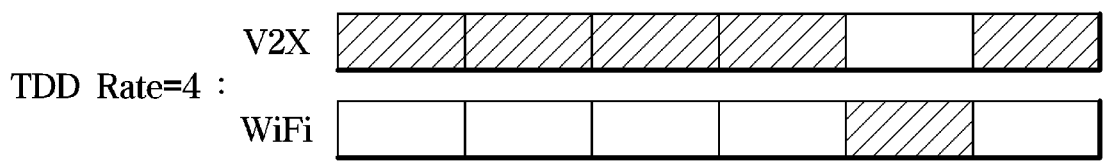

When the WiFi communication rate is less than 40 Mbps, the ratio of the first time to the second time may be "4," as illustrated in FIG. 7. As illustrated in FIG. 8D, the first time may be four times the second time.

Figure 8E:
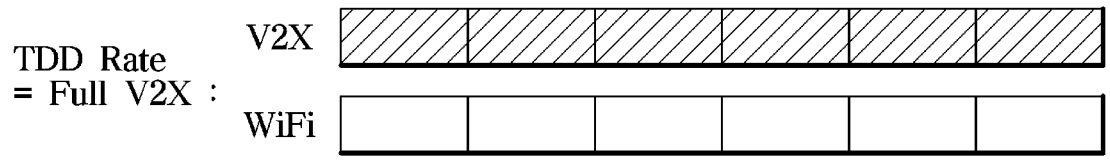

When WiFi communication is deactivated, the WiFi communication antenna 230 may be only used for the V2X communication as illustrated in FIG. 8E.

As described above, the vehicle 1 may implement spatial diversity for the V2X communication using the V2X communication antenna 210 for the V2X communication and the WiFi communication antenna 230 for the WiFi communication.

When the WiFi communication service is activated, the vehicle 1 may alternately use the WiFi communication antenna 230 for the WiFi communication and the diversity of the V2X communication. Particularly, the vehicle 1 may use the WiFi communication antenna 230 for the diversity of the V2X communication for the first time, and the vehicle 1 may use the WiFi communication antenna 230 for the WiFi communication for the second time.

When the WiFi communication service is deactivated, the vehicle 1 may use the WiFi communication antenna 230 only for the diversity of the V2X communication.

Figure 9:
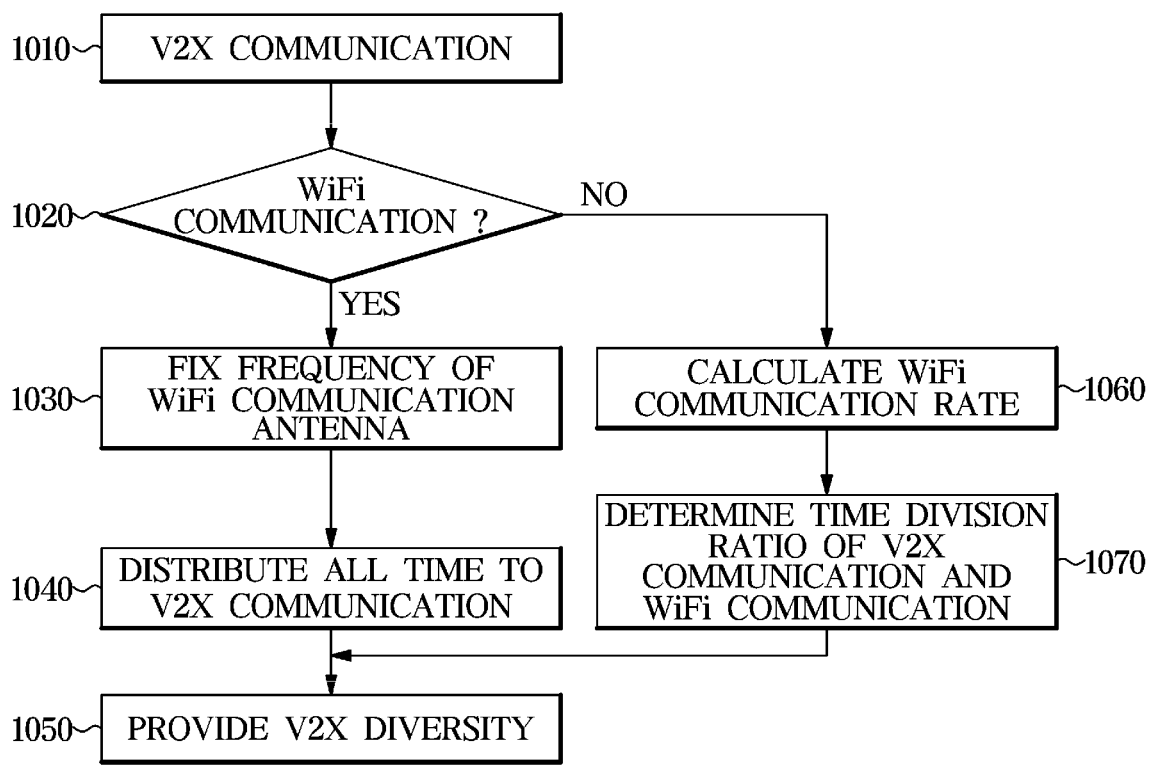
FIG. 9 is a view illustrating a communication operation of the vehicle according to an embodiment.
Figure 10:
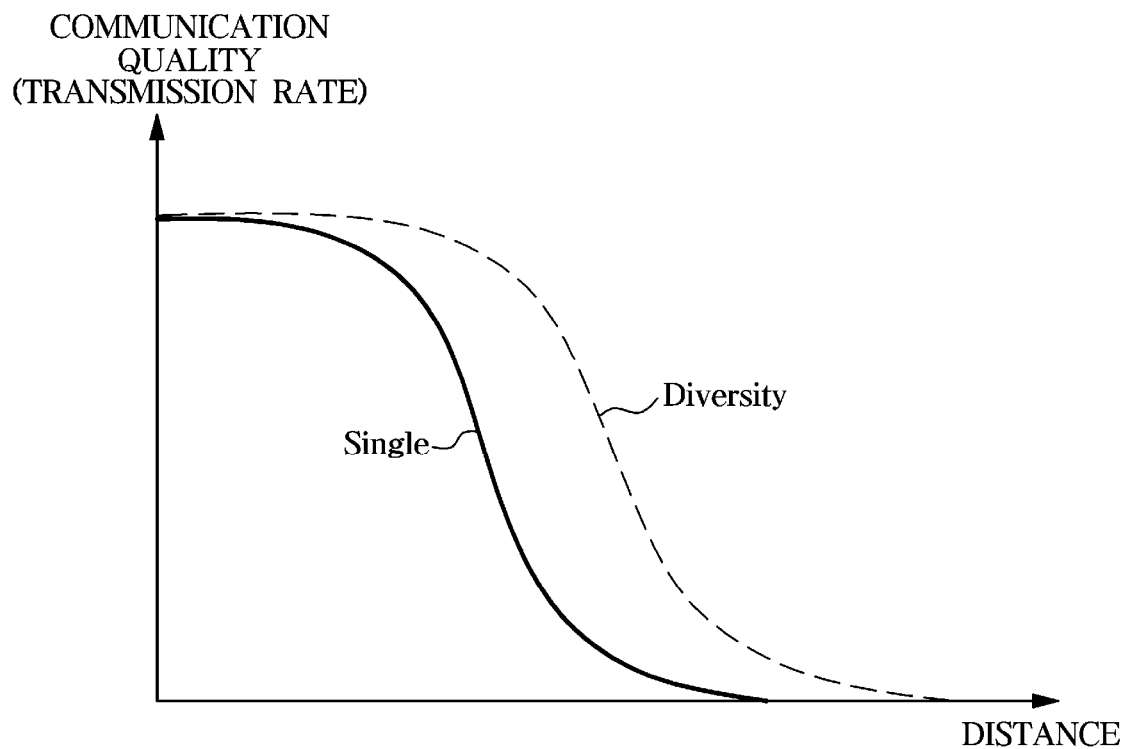
FIG. 10 is a view illustrating an improvement in the communication quality of the vehicle by the communication operation illustrated in FIG. 9.

FIG. 9 is a view illustrating a communication operation of the vehicle according to an embodiment and FIG. 10 is a view illustrating an improvement in the communication quality of the vehicle by the communication operation illustrated in FIG. 9.

Referring to FIG. 9, the vehicle 1 may provide the V2X communication (1010).

The vehicle 1 may communicate with the other vehicle 2 or communicate with the traffic infrastructure by using the DSRC or the WAVE.

The vehicle 1 may determine whether to provide the WiFi communication (1020).

The vehicle 1 may communicate with the communication infrastructure 3 by using the WiFi communication at the request of the driver or for upgrading the software.

When the WiFi communication is not provided (NO in 1020), the vehicle 1 may fix the frequency of the WiFi communication antenna 230 (1030).

The vehicle 1 may activate the first WiFi communication antenna 231 capable of transmitting and receiving the radio signal in the frequency band of approximately 5000 to 5895 MHz and deactivate the second WiFi communication antenna 232 capable of transmitting and receiving the radio signal in the frequency band of approximately 2400 to 2483 MHz.

When the WiFi communication is not provided (NO in 1020), the vehicle 1 may also use the WiFi communication antenna 230 only for the V2X communication (1040).

While WiFi communication is deactivated, the vehicle 1 may control the communicator so that the WiFi communication antenna 230 is used for the V2X communication.

The vehicle 1 may also perform diversity for the V2X communication by using the WiFi communication antenna 230 (1050).

The vehicle 1 may perform the diversity for the V2X communication and improve the quality of the V2X communication by synthesizing the signal received through the WiFi communication antenna 230 and the signal received through the V2X communication antenna 210.

When the WiFi communication is provided (YES in 1020), the vehicle 1 may calculate the WiFi communication rate (1060).

The vehicle 1 may calculate the transmission speed of data through the WiFi communication according to the request of the driver or the request of the system.

The vehicle 1 may calculate the time division ratio of the V2X communication and the WiFi communication (1070).

The vehicle 1 may alternately use the WiFi communication antenna 230 for the WiFi communication and the diversity of the V2X communication. Particularly, the vehicle 1 may use the WiFi communication antenna 230 for the diversity of the V2X communication for the first time, and the vehicle 1 may use the WiFi communication antenna 230 for the WiFi communication for the second time.

The vehicle 1 may calculate the time division ratio of the V2X communication and the WiFi communication, that is, the ratio of the first time to the second time, based on the data transmission rate through the WiFi communication.

The vehicle 1 may perform the diversity for the V2X communication by using the WiFi communication antenna 230 (1050).

When the WiFi communication is activated, the vehicle 1 may use the WiFi communication antenna 230 for the first time, and the vehicle 1 may not perform the diversity of the V2X communication for the second time.

As illustrated in FIG. 10, the V2X communication quality of the vehicle 1 is improved when the WiFi communication antenna 230 is used for the diversity of the V2X communication, as compared with the case of using only the V2X communication antenna 210.

As is apparent from the above description, the embodiments of the present disclosure may provide the vehicle capable of improving communication (V2V) performance with the external device, and the method for controlling the same.

Further, the present disclosure may provide the vehicle capable of realizing the diversity of the DSRC communication using the DSRC antenna for the DSRC communication and the WiFi antenna for WiFi communication, and the method for controlling the same.

Further, the present disclosure may provide the vehicle capable of realizing the diversity of the DSRC communication without adding an antenna for the diversity of the DSRC communication because it uses an existing WiFi antenna, and the method for controlling the same.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. The medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
a first antenna configured to receive a first signal;
a second antenna configured to receive a second signal; and
a controller configured to:
   synthesize the first signal and the second signal and process a synthesized signal, in which the first signal and the second signal are synthesized, according to a first communication method, in a first mode; and
   alternately process the synthesized signal according to the first communication method and process the second signal according to a second communication method, in a second mode,
wherein the controller comprises:
   a signal processor configured to process a signal according to one of the first communication method and the second communication method;
   a synthesizer configured to synthesize the first signal and the second signal; and
   a time divider configured to output the second signal to one of the synthesizer and the signal processor,
wherein the time divider is configured to output the second signal to the synthesizer when communication by the second communication method is deactivated, and wherein the signal processor is configured to process the synthesized signal according to the first communication method.

2. The vehicle according to claim 1, wherein the time divider is configured to output the second signal to the synthesizer for a first time when communication by the second communication method is activated, and wherein the signal processor is configured to process the synthesized signal, which is output from the synthesizer, according to the first communication method.

3. The vehicle according to claim 2, wherein the time divider is configured to output the second signal to the signal processor for a second time when communication by the second communication method is activated, and wherein the signal processor is configured to process the second signal, which is output from the time divider, according to the second communication method.

4. The vehicle according to claim 3, wherein the synthesizer is configured to output the first signal to the signal processor for the second time when communication by the second communication method is activated, and wherein the signal processor is configured to process the first signal according to the first communication method.

5. The vehicle according to claim 4, wherein the controller is configured to change a ratio of the first time to the second time according to a communication rate by the second communication method.

6. The vehicle according to claim 5, wherein the controller is configured to decrease the ratio of the first time to the second time as the communication rate by the second communication method increases.

7. The vehicle according to claim 5, wherein the controller is configured to increase the ratio of the first time to the second time as the communication rate by the second communication method decreases.

8. A method for controlling a vehicle which comprises a first antenna configured to receive a first signal and a second antenna configured to receive a second signal, the method comprising steps of:

synthesizing, by a synthesizer, the first signal and the second signal and processing a synthesized signal, in which the first signal and the second signal are synthesized, according to a first communication method, in a first mode;

alternately processing, by a signal processor, the synthesized signal according to the first communication method and processing the second signal according to a second communication method, in a second mode; and wherein the step of alternately processing the synthesized signal and the second signal comprises:

outputting the second signal to the synthesizer by a time divider when communication by the second communication method is deactivated; and processing, by the signal processor, the synthesized signal, which is output from the synthesizer, according to the first communication method.

9. The method according to claim 8, wherein the step of alternately the processing the synthesized signal and the second signal comprises:

outputting the second signal to the synthesizer by a time divider for a first time when communication by the second communication method is activated; and processing, by the signal processor, the synthesized signal, which is output from the synthesizer, according to the first communication method.

10. The method according to claim 9, wherein the step of alternately processing of the synthesized signal and the second signal further comprises:

outputting the second signal to the signal processor by the time divider for a second time when communication by the second communication method is activated; and processing, by the signal processor, the second signal according to the second communication method.

11. The method according to claim 10, wherein the step of alternately processing the synthesized signal and the second signal further comprises:

outputting, by the synthesizer, the first signal to the signal processor for the second time when communication by the second communication method is activated; and processing, by the signal processor, the first signal according to the first communication method.

12. The method according to claim 11, wherein a ratio of the first time to the second time is configured to change according to a communication rate by the second communication method.

13. The method according to claim 12, wherein the ratio of the first time to the second time decreases as the communication rate by the second communication method increases.

14. The method according to claim 13, wherein the ratio of the first time to the second time increases as the communication rate by the second communication method decreases.

15. A communication apparatus for a vehicle comprising:
a first antenna configured to receive a first signal;
a second antenna configured to receive a second signal;
a signal processor configured to process a signal according to one of a first communication method and a second communication method;
a synthesizer configured to synthesize the first signal and the second signal;
a time divider configured to output the second signal to one of the synthesizer and the signal processor; and
wherein the time divider is configured to output the second signal to the synthesizer when communication by the second communication method is deactivated, and
wherein the signal processor is configured to process the signal synthesized by the synthesizer according to the first communication method.

16. The communication apparatus according to claim 15, wherein the time divider is configured to output the second signal to the synthesizer for a first time when communication by the second communication method is activated,
wherein the signal processor is configured to process the signal output from the synthesizer according to the first communication method,
wherein the time divider is configured to output the second signal to the signal processor for a second time, and
wherein the signal processor is configured to process the second signal output from the time divider according to the second communication method.

* * * * *